US006549685B2

United States Patent
Marks et al.

(10) Patent No.: US 6,549,685 B2
(45) Date of Patent: Apr. 15, 2003

(54) HIGH-RESPONSE ELECTRO-OPTIC MODULATOR BASED ON AN INTRINSICALLY ACENTRIC, LAYER-BY-LAYER SELF-ASSEMBLED MOLECULAR SUPERLATTICE

(75) Inventors: Tobin J. Marks, Evanston, IL (US); Seng-Tiong Ho, Wheeling, IL (US); Milko E. van der Boom, Evanston, IL (US); Yi-Guang Zhao, Wilmette, IL (US); Wei-Kang Lu, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/773,724

(22) Filed: Jan. 31, 2001

(65) Prior Publication Data

US 2002/0131663 A1 Sep. 19, 2002

(51) Int. Cl.$^7$ .............................................. G02F 1/035
(52) U.S. Cl. .............................. 385/2; 385/8; 385/130; 385/131
(58) Field of Search .............................. 385/2, 10, 3, 4, 385/8, 37, 129–132, 40; 428/447, 448, 429; 430/321

(56) References Cited

U.S. PATENT DOCUMENTS 5,156,918 A    10/1992    Marks et al.
6,033,774 A    * 3/2000    Yitzchaik et al. ........... 385/131

OTHER PUBLICATIONS

Zhao, et al. "Polymer waveguides useful over a very wide wavelength range from the ultraviolet to infrared", *Applied-Physics Letters*, Nov. 6, 2000, p. 2961–2963, #19, vol. 77, American Institute of Physics.

Lin, et al. "Supramolecular Approaches to Second–Order Nonlinear Optical Materials. Self–Assembly and Microstructural Characterization of Intrinsically Acentric [(Aminophenyl)azo]pyridinium Superlattices", *Journal of American Chemical Society*, Feb. 7, 1996, p. 8034–8042, vol. 118, American Chemical Society.

G.J. Ashwell, et al., "Improved second–harmonic generation from Langmuir–Blodgett films of hemicyanine dyes," Jun. 4, 1992, Nature, vol. 357, pp. 393–395.

J. P. Creswell, et al., "An electro–optic Fabry–Perot through– plane–modulator based on a Langmuir–Blodgett film," Mar. 15, 1995, Optics Communications 115, pp. 271–275.

* cited by examiner

Primary Examiner—Phan T. H. Palmer
(74) Attorney, Agent, or Firm—Reinhart, Boerner Van Deuren, s.c.

(57) ABSTRACT

A new electro-optic (EO) phase modulator constructed from a combination of a low-loss passive polymer waveguide and a self-assembled chromophore superlattice (SAS) with an intrinsically polar microstructure. In contrast to typical polymer-based modulators, the present invention utilizes a siloxane SA methodology that enables the acentric alignment of constituent chromophores during film growth without the need for post-deposition electric field poling. The guiding layer is constructed of the SAS and the glassy polymer Cyclotene™. The use of SiO$_2$, Cytop™ and Cyclotene™ glassy polymers, results in a straightforward device fabrication process that is compatible with the thermally and photochemically robust SAS. Thus, nanoscale control of the film architecture results in greatly simplified macroscopic device fabrication. The present invention provides a SAS-based electro-optic modulator demonstrating excellent electro-optic response properties and a $\pi$ phase shift.

12 Claims, 9 Drawing Sheets

Cyclotene™ monomer

Cytop™

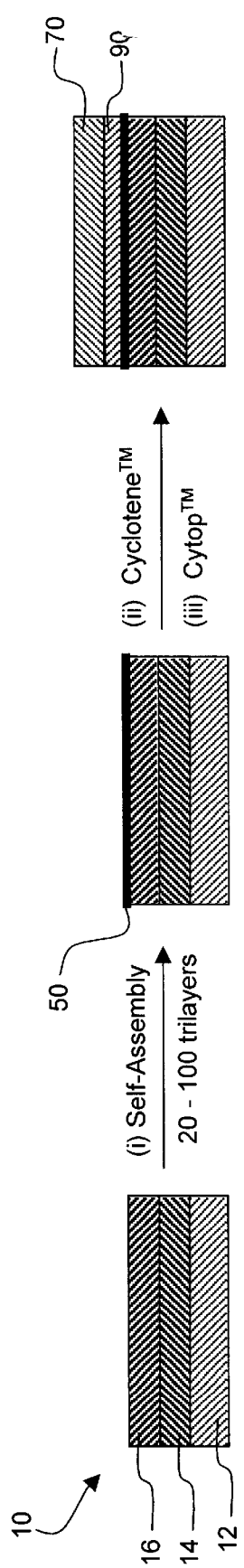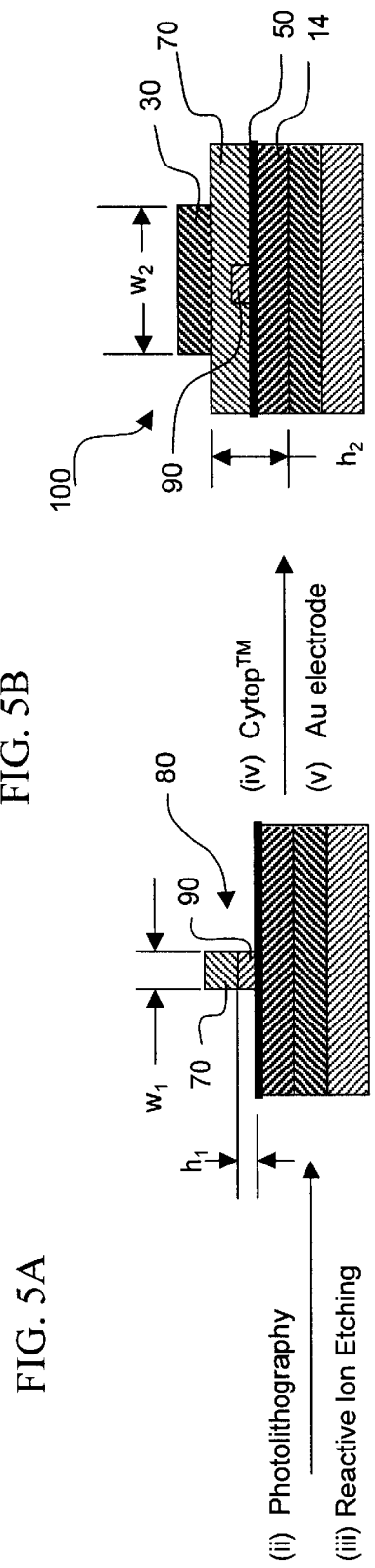

HIGH-RESPONSE ELECTRO-OPTIC MODULATOR BASED ON AN INTRINSICALLY ACENTRIC, LAYER-BY-LAYER SELF-ASSEMBLED MOLECULAR SUPERLATTICE

The present invention was developed under grant DMR-9632472 provided by the National Science Foundation and grant N00014-95-1-11319. The United States Government has certain rights in this invention.

FIELD OF THE INVENTION

This invention relates to electro-optic modulators and the materials and methods used to fabricate such modulators.

BACKGROUND OF INVENTION

Over the past thirty years, significant time and effort has been dedicated to the study of various materials such as, $LiNbO_3$, III–V semiconductors, and organic polymers, to determine their respective characteristics for the fabrication and performance as electro-optic (EO) devices (e.g., modulators, waveguides, switches, emitters, detectors, and the like). When compared to inorganic crystal-based modulators, organic polymers provide significant advantages including higher speed and lower half-wave voltage (i.e., $V_\pi$). That is due, at least in part, to the fact that organic polymers have lower dielectric constants than their inorganic counterparts, which permits optical signals (i.e., waves) and microwaves to propagate within a device constructed from such organic materials with nearly equal phase velocities. Moreover, organic polymers exhibit large molecular hyperpolarizabilities and the possibility of exceptionally high electro-optic coefficients ($r_{33}$), which are also important for reducing $V_\pi$. For example, organic modulators have been demonstrated at operating frequencies as high as 113 GHz and a $V_\pi$ of approximately 0.8V. However, such modulators have used electric field poled polymers as the electro-optic active layer. Such materials are, in general, characterized by loss-inducing chromophore aggregation effects, charge injection-induced degradation, and low degrees of polar orientation that can be achieved by the electric field poling process. In addition, it is difficult to achieve a sufficiently high glass transition temperature value, $T_g$, to ensure a stable polar orientation over prolonged periods of time at realistic use temperatures for poled polymers. Unfortunately, known electro-optic modulators that use poled polymers require electric field poling to provide polar orientation, typically requiring a poling voltage of between 500 V and 1000 V, which increases the electrode size needed to accommodate that voltage. Moreover, polar alignment is likely to be lost over time, as the device experiences thermal cycling and exposure to elevated temperatures (both during processing and operation). All of the above-described disadvantages of known polymer-based electro-optic devices increase the design and fabrication complexity of the devices and, consequently, the cost.

Polar organic materials can exhibit far higher electro-optic coefficients ($r_{33}$) and lower dielectric constants ($\epsilon$) than conventional inorganic EO materials, suggesting the possibility of inexpensive organic modulators with digital-level operating voltages (i.e., low) and large bandwidths (e.g., compare the figure-of-merit, $n^3 r_{33}/\epsilon$ for SAS (self-assembled superlattices)=20–140 pm/V, versus 10–40 pm/V for poled-polymers and 8.7 pm/V for $LiNbO_3$). Practical organic materials must meet many criteria. For example, continuous on-chip device operating temperatures can range from 80–100° C., on average, and may reach as high as 250° C. during processing-induced excursions. Practical organic materials thus require noncentrosymmetric microstructures with long-term stability. As mentioned above, sophisticated poled-polymer modulators are rapidly approaching or even exceeding the performance of inorganic devices in terms of bandwidth (i.e., speed) and operating voltage. Further computationally aided development of efficient, robust and simple organic chromophores exhibiting large first ($\beta$) and second hyperpolarizabilities is expected to dramatically improve device performance. It is conceivable that applicable low-drive-voltage EO modulators based on ultra-high glass transition temperature polymers ($T_g \geq 300°$ C.), to prevent thermal randomization of chromophore orientation, might someday become a reality. Nevertheless, there is a great need for the innovative design of EO organic materials and modulators which do not require poling. For instance, polar chromophore alignment is generally induced near $T_g$ values using high electric fields (e.g., $10^6$ V/cm), making incorporation of intrinsically acentric (i.e., not requiring poling) organic films into device structures a desirable alternative. One challenge is clear: can utilization of such materials reduce device design complexity? Minimizing processing steps would doubtless lead to smaller components and simplify large-scale fabrication.

The rapidly expanding use of optical telecommunications and public networking requires high speed optical-to-electrical data conversion, which in turns drives a vast need for advanced, extremely efficient electro-optic devices such as modulators, waveguides, switches, emitters, and detectors. Integration of "soft materials" in the form of organic thin films into such electro-optic device offers new device properties, enhanced performance, and eventually lower production costs.

SUMMARY OF THE INVENTION

The present invention utilizes layer-by-layer molecular self-assembled (SA) templated formation of intrinsically polar arrays of high-$\beta$ chromophores grown directly on silicon or related substrates. That process does not require electric-field poling, poling electrodes, or electrically matched buffer layers and, therefore, enables ready integration into semiconductor electronics and into the latest all-organic microphotonic and nanophotonic circuits. Furthermore, programmed polar microstructures in accordance with the present invention often exhibit excellent chemical, photochemical, and thermal stability, and are compatible with soft lithography (including templated growth on patterned substrates). The very large chromophore densities ($N_{max}$ of approximately molecule/$10^{21}$ molecules per $cm^{-3}$) and high degrees of net polar orientation result in superior EO responses ($r_{33}$ ranging from approximately 40 to 200 pm/V). Chemical modifications of the molecular building blocks, such as those described herein, allow systematic optimization of SA techniques, material characteristics, and eventually, device quality.

The present invention is directed to a new electro-optic (EO) phase modulator constructed from a combination of a low-loss passive polymer waveguide and a self-assembled chromophore superlattice (SAS) with an intrinsic polar structure. In contrast to typical polymer-based modulators, the present invention utilizes a siloxane SA methodology that enables the acentric alignment of constituent chromophores during film growth without the need for post-deposition electric-field poling. The present invention thus significantly reduces the size and complexity of electrodes required to fabricate electro-optic devices because the electrodes no longer need to accommodate the high poling voltages required to align molecules during formation of an electro-optic device, as is the case with prior art devices. The present invention further provides electro-optic devices that are thermally stable and less susceptible to variation in structure (e.g., polar alignment) and optical characteristics over time.

The use of $SiO_2$, Cytop™ (a commercially available fluorinated polymer) and Cyclotene™ 3022-35 (a commercially available polybisbenzocyclobutane) glassy polymers in accordance with the present invention results in a straightforward device formation process that is compatible with the thermally and photochemically robust SAS materials. Other transparent polymers with appropriate refractive indices may also be used in place of Cytop™ and Cyclotene™ 3022-35. Thus, nanoscale control of the film architecture results in greatly simplified macroscopic device fabrication. The present invention thus provides a SAS-based electro-optic modulator demonstrating excellent electro-optic response properties and a π phase shift.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference numerals depict like elements throughout the several views:

FIGS. 5A–5E depict a fabrication process for a SAS-based electro-optic phase modulator constructed in accordance with the present invention;

DETAILED DESCRIPTION OF THE PREFERRED EMBODIMENTS

The present invention is directed to a new electro-optic (EO) phase modulator constructed from a combination of a low-loss passive polymer waveguide and a self-assembled chromophore superlattice (SAS) with an intrinsically polar structure.

Self-assembled superlattices and optical devices constructed therefrom are disclosed in U.S. Pat. Nos. 6,033,774 and 5,156,918, which are each hereby incorporated by reference in their respective entireties.

Figure 1:
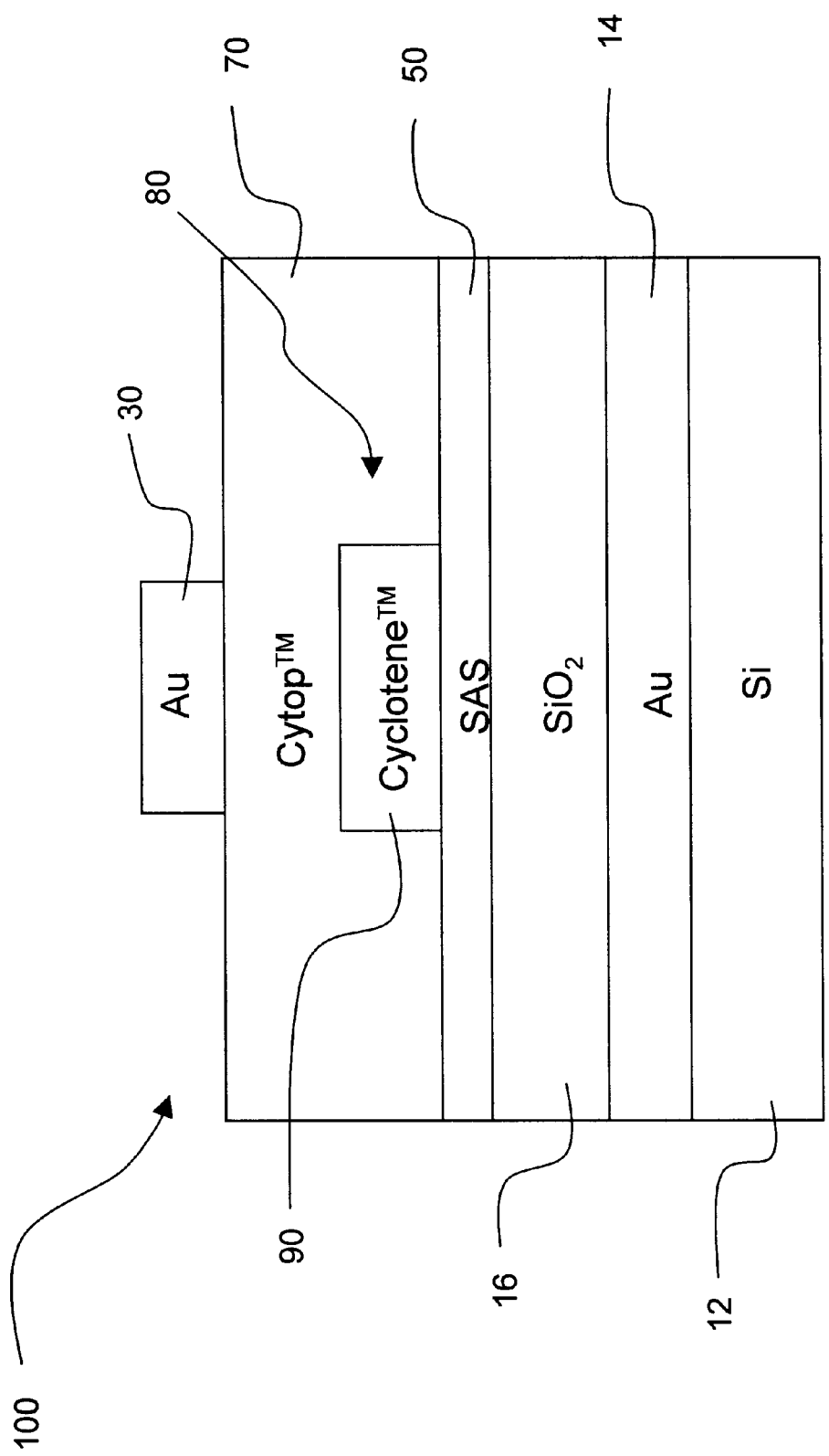
FIG. 1 is a structural block diagram of an electro-optic phase modulator constructed in accordance with an embodiment of the present invention.
Figure 2E:
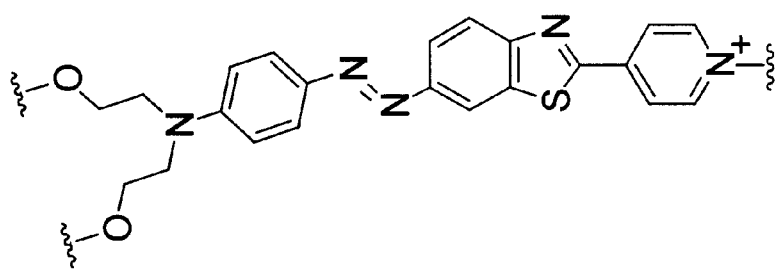
FIGS. 2A–2E depict representative high-β chromophore building blocks for layer-by-layer formation of acentric, optically functional self-assembled superlattices.
Figure 2D:
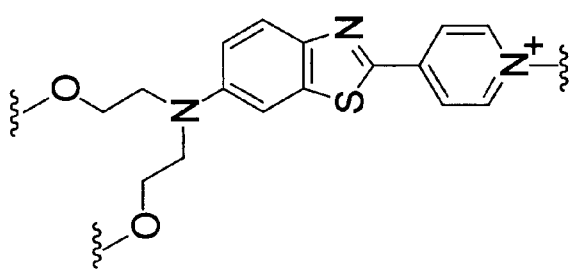
Figure 2C:
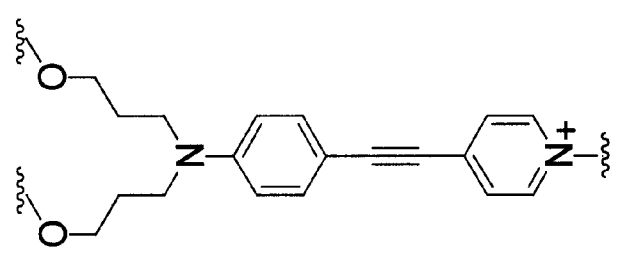
Figure 2B:
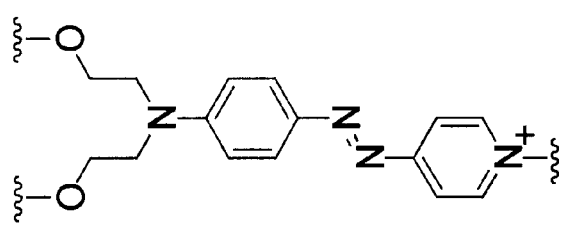
Figure 2A:
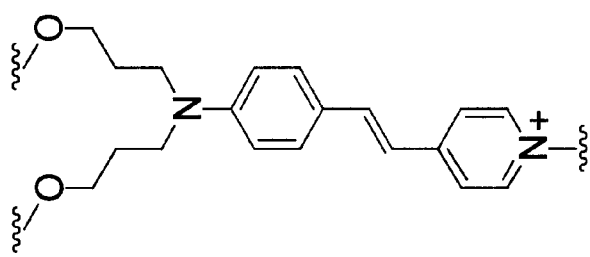
Figure 4B:
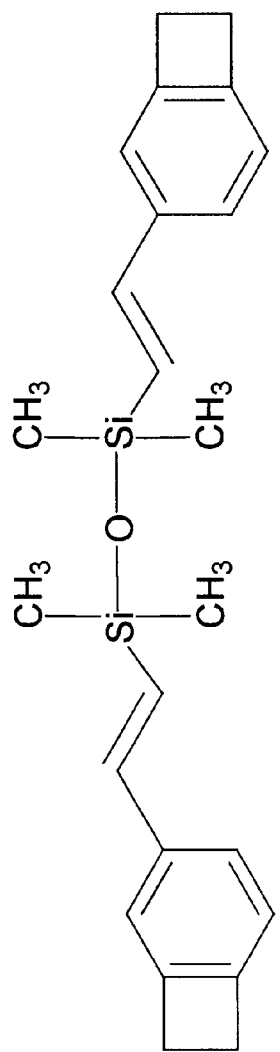
FIGS. 4A and 4B respectively depict the structural formulae of Cytop™ and Cyclotene™ 3022-35.
Figure 4A:
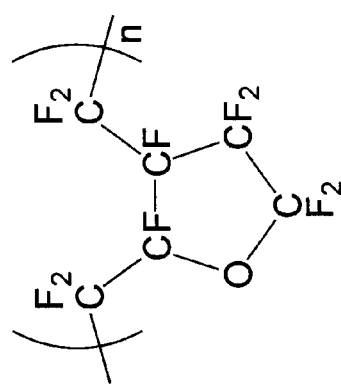
Figure 7:
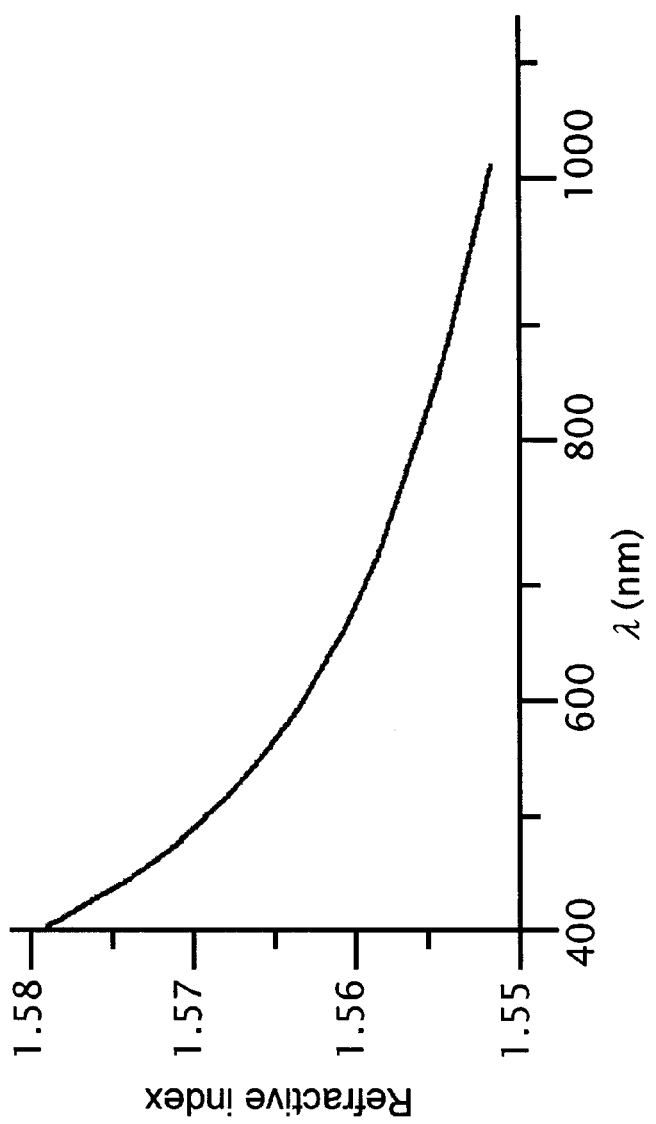
FIG. 7 is a graphical depiction of the ellipsometry-derived refractive index of a 1-based SAS on a Si substrate as a function of wavelength (nm)

In accordance with an embodiment of the present invention, and with reference first to FIG. 1, an electro-optic phase modulator 100 constructed in accordance with an embodiment of the present invention comprises a waveguide 80 comprised of a SAS 50 with an intrinsic polar structure and a low-loss glassy polymer layer 90 (e.g., Cyclotene™), surrounded by a low refractive index $SiO_2$ bottom cladding layer 16 and a low refractive index top cladding layer 70 (e.g., Cytop™). Bottom and top electrodes 14, 30, comprising a metal, alloy, or conductive compound, for example, are provided adjacent the bottom and top cladding layers, 16, 70, respectively. A silicon substrate 12 provides a foundation upon which the inventive electro-optic modulator 100 may be fabricated. The present invention enables formation of a wide variety of optical waveguide building-block structures using well-established and known (described below) fabrication processes and at the same time, ensures manufacturability. The commercially available glassy polymers Cytop™ and Cyclotene™, which are structurally depicted in FIGS. 4A and 4B, respectively, are suitable as low-loss waveguiding and cladding materials because of excellent optical transparency (approximately 95%) over the ultraviolet to infrared wavelength range, and provide sufficient refractive index difference, e.g., n(Cyclotene™)-n (Cytop™)=0.21, to confine the propagating light beam in the waveguide. For instance, a linear Cytop™/Cyclotene™/Cytop™ 'sandwich' exhibits a propagation loss of approximately 0.8 dB/cm−1 at 1550 nm wavelength for a 1.2×2.0 μm waveguide 80. The Cyclotene™ refractive index n of approximately 1.55, is almost identical to that of the ellipsometry-derived refractive index of a first-generation 1-based SAS at 1064 nm wavelength, and is a function of wavelength, as depicted in FIG. 7.

Figure 3:
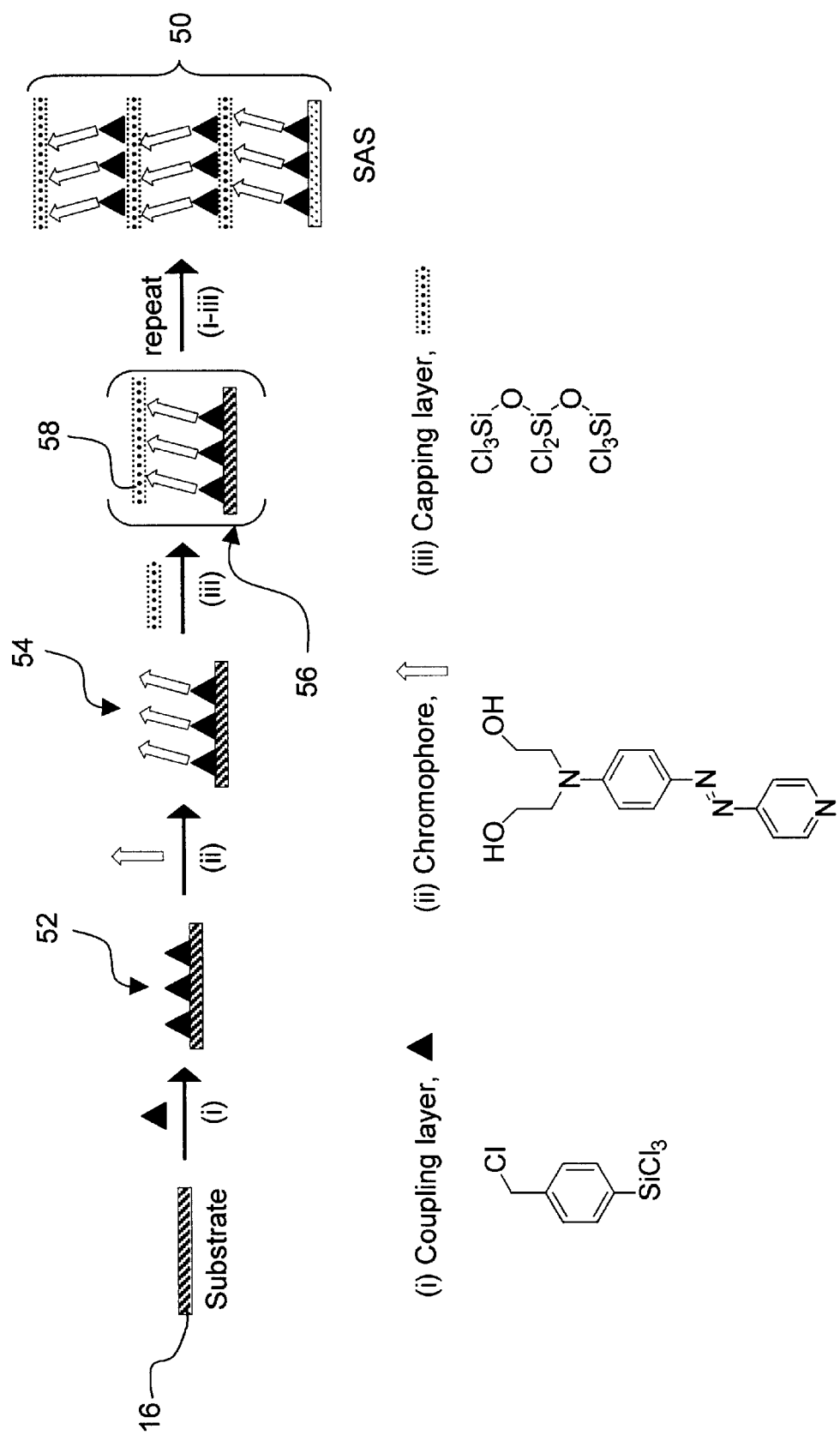
FIG. 3 depicts a representative iterative process for layer-by-layer self-assembly of 1-based chromophoric superlattices in accordance with an embodiment of the present invention.

Intrinsically acentric multi-layers composed of stilbazolium-or benzothiazole-type chromophores, such as those depicted in FIGS. 2A–2E, can be obtained by a 'first-generation' iterative three-step reaction sequence. Referring to FIG. 3, that sequence involves: (i) covalent chemisorption of an alkyl-halide functionalized trichlorosilyl coupling agent to a hydroxylated surface (probably via a physisorbed precursor and designated as a substrate 16) to form a coupling layer 52; (ii) quaternization of a high-β chromophore-precursor by the covalently bound coupling layer 52 to generate an EO-active layer 54; and (iii) reaction of the chromophoric pyridinium surface with octachlorotrisiloxane to form a trilayer 56. Step (iii), also referred to herein as a capping step, deposits a polysiloxane film capping layer 58 having a thickness of approximately 0.8 nm, and generates a large density of reactive hydroxyl sites necessary for subsequent layer deposition (i.e., during repetition of steps (i)–(iii), for example), and provides structural stabilization via interchromophore crosslinking. Steps (i)–(iii) of FIG. 3 may be repeated to form a desired number of intrinsically acentric multilayers or trilayers 52, thus forming a multilayer SAS 50.

Figure 9:
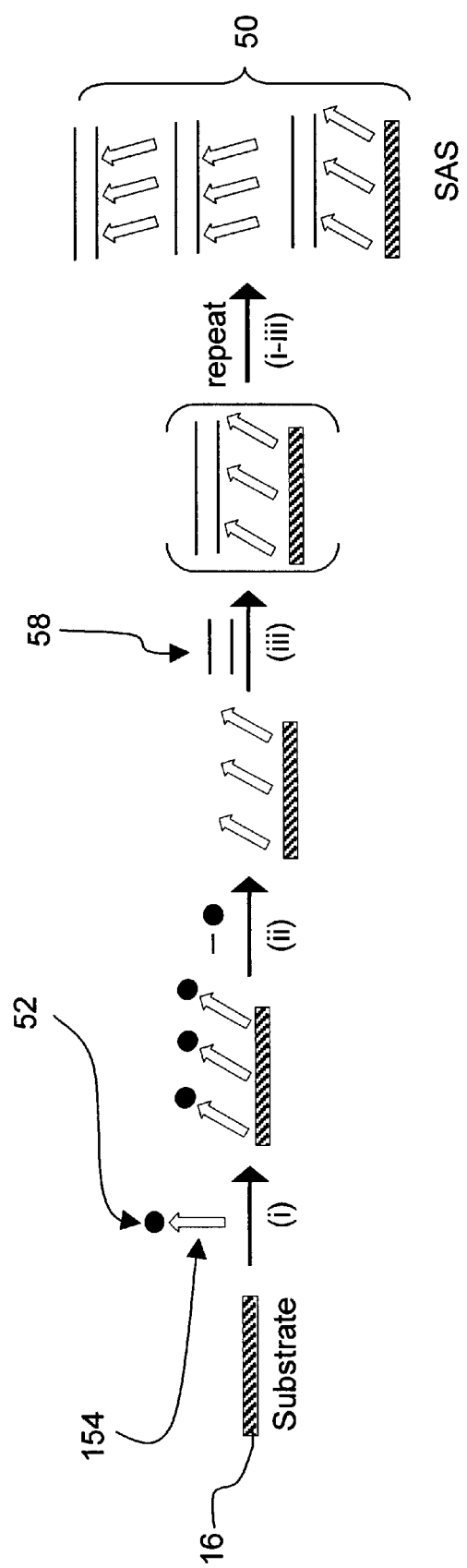
FIG. 9 depicts an alternative protection-deprotection iterative process for layer-by-layer self-assembly of chromophore self-assembled superlattices.

Alternatively, a 'second-generation' single reactor route (i.e., process) can be used as well in which the chromophore-precursor hydroxyl groups (chromophores of the type depicted in FIG. 2) are derivatized (i.e., protected) with tert-butyldimethylsilyl (TBDMS) 52 followed by quaternization with the coupling agent in solution, generally depicted in FIG. 9. The second-generation, generally applicable self-assembly process involves the iterative combination of: (i) covalent chemisorption of polar monolayers of high-β chromophores 154 of the type depicted in FIG. 2; (ii) selective removal of tert-butyldimethylsilyl protecting groups 52 from the surface bound chromophore films with tetra-n-butylammonium fluoride (a commercially available reagent) in an organic solvent (tetrahydrofuran) to generate a large density of reactive hydroxyl sites; and (iii) reaction of each 'deprotected' chromophore layer with a heptane solution of octachlorotrisiloxane to form a capping layer 58. This 'capping' step deposits a thin polysiloxane film (~0.8 nm thick) and is essential for formation of an acentric multilayer structure since it provides structural stabilization/planarization via interchromophore crosslinking. The new thermally and photochemically robust superlattices exhibit very high second-order responses ($X^{(2)}$ as large as ~220 pm/V), adhere strongly to the sodium lime glass, silicon, or indium tin oxide-coated glass (ITO) substrates, and are insoluble in common organic solvents (e.g., toluene, methanol, acetone, tetrahydrofuran, pentane, heptane).

Subsequent polar chemisorption of the high-β chromophores (see, e.g., FIG. 9, step (i)) followed by TBDMS removal (step (ii)), and capping of each deprotected chromophore layer (step (iii)) yields robust EO-films. The SAS layers have absorption maxima of less than approximately 600 nm, adhere strongly to the substrates, and are remarkably difficult to remove, even by reactive ion etching. The synthetic schemes allow tailored physical properties to meet the needs of specific applications. For instance, integration of high refractive index inorganic materials ($n \geq 2.0$) by solution phase deposition of approximately 3 nm thick metal oxide layers (e.g., by hydrolysis of $Ga(O^iC3H7)_3$) onto the hydrophilic polysiloxane surface (after FIG. 9, step (iii)) results in formation of hybrid organic-inorganic SAS structures and opens possibilities to tune the refractive index contrast between SA films and device components (e.g., cladding layers, modulating electrodes) to better confine the light beam, hence to enhance modulator performance. Both first and second generation SAS properties exceed the crucial material requirements (e.g., compare the figure-of-merit, $n^3 r_{33}/\epsilon$, for SAS (self-assembled superlattices)= 20–140 pm/V, 10–40 pm/V for poled-polymers, and 8.7 pm/V for $LiNbO_3$) in terms of stability and nonlinear optical properties for device fabrication and performance, and have been characterized by a full complement of physicochemical techniques including X-ray photoelectron spectroscopy, X-ray reflectivity, AFM, and angle-dependent polarized second harmonic generation. In a preferred embodiment, the SAS 50 comprises a plurality of molecular chromophore fragments each consisting of a plurality of electron donating and accepting groups interconnected by a conjugated π-electron system and exhibiting a large molecular hyperpolarizability. The donating and accepting groups of one molecular chromophore fragment are connected to the donating and accepting groups of another molecular chromophore fragment by silicon-oxygen linkages to form an acentric layered structure exhibiting a large electro-optic coefficient.

Referring next to FIGS. 5A–5E, an exemplary embodiment of a SAS-based electro-optic phase modulator 100 constructed in accordance with the present invention is there depicted. The modulator 100 includes a substrate 10 comprising a silicon wafer 12 having a top surface coated with gold to form a bottom electrode 14. The substrate 10 also includes a silicon dioxide ($SiO_2$) bottom cladding layer 16 deposited on the bottom electrode 14 (FIG. 5A). A multilayer SAS 50 (FIG. 5B) is provided on the substrate 10 (deposited on top of the bottom electrode 14), followed by a glassy polymer layer 90, preferably Cytop™, and top cladding layer 70; preferably Cyclotene™ 3022-35. The glassy polymer layer 90 and top cladding layer 70 are initially deposited at the width of the substrate 10 (FIG. 5C). The glassy polymer layer 90 and top cladding layer 70 are etched to a desired width, $w_1$, (FIG. 5D), and the top cladding layer 70 is redeposited or regrown to the width of the substrate 10 so as to surround the glassy polymer layer 90 and provide a buried waveguide 80 (FIGS. 5D and 5E), defined by the combination of the SAS 50 and Cytop™ glassy polymer layer 90.

With continued reference to FIGS. 5A–5E, an exemplary fabrication process in accordance with the present invention will now be discussed. An SAS-based electro-optic phase modulator 100 may be fabricated on a substrate 10 comprised of a gold-coated silicon wafer 12, with the gold coating acting as the ground-modulating electrode 14 (FIG. 5A). A chemical vapor-deposited 2.0 μm thick $SiO_2$ film provides: (i) a bottom cladding layer 16 to separate the guided light (guided by and within the waveguide 80) from the bottom electrode 14; and (ii) as a substrate for SAS growth by molecular self-assembly, for example, and as described in more detail below and also in the article by Lin et al. entitled "Supramolecular Approaches to Second-Order Nonlinear Optical Materials. Self-Assembly and Microstructural Characterization of Intrinsically Acentric [(Aminophenyl)azo]pyridinium Superlattices", Journal of American Chemical Society, 1996, 118, 8034–8042, which is hereby incorporated by reference in its entirety.

Construction of Chromophoric Superlattices.

Sodium lime glass, quartz, or silicon wafer substrates were cleaned by immersion in "piranha" solution at 80° C. for 1 hour. After being cooled to room temperature, they were rinsed repeatedly with deionized water and then subjected to an RCA-type cleaning protocol (e.g., room temperature, for 40 minutes). They were then washed with deionized water and dried under vacuum immediately before coupling agent deposition.

(i) Self-Assembly of $4-ClCH_2C_6H_4SiCl_3$.

Under inert atmosphere, freshly cleaned glass or silicon single crystal substrates were immersed in a 1:100 (v/v) solution of $4-ClCH_2C_6H_4SiCl_3$ in heptane for 20 minutes, washed with pentane, and sonicated in acetone for 1 minute. The $3-BrC_3H_6SiCl_3$ and $3-IC_3H_6SiCl_3$ coupling layers were chemisorbed similarly.

(ii) Self-Assembly of the 4-[[4-[N,N-Bis(hydroxylethyl) amino]-phenyl]azo]pyridinium Chromophore.

The silylated substrates (after step (i) treatment, above) were spin-coated at 4000 rpm with a 5 mM solution of 4-[[4-[N,N-bis(hydroxylethyl)amino]phenyl]azo]pyridine in methanol inside a class 100 clean hood (Envirco) and then heated at 110° C. in a vacuum oven (0.4 Torr) for 13 minutes. The samples were cooled to room temperature and then washed with methanol and acetone to remove any residual 1.

(iii) Self-Assembly of Octachlorotrisiloxane.

The glass and silicon single crystal substrates after step (i) and step (ii) treatment, above, were immersed in a 1:150 (v/v) solution of octachlorotrisiloxane in heptane for 30 minutes, washed with pentane, and sonicated in acetone for 1 minute.

The SAS 50 comprises a plurality of trilayers 56, each comprised of a coupling layer 52, a chromophore 54, and a capping layer 58, as depicted in FIG. 3. The SAS 50 is preferably comprised of at least twenty (20) trilayers, and more preferably, of at least forty (40) trilayers; with more trilayers improving the performance of the modulator 100. Each trilayer 52 is preferably approximately 2.5 nm thick, thus providing a total SAS layer 50 thickness of approximately 0.05 µm and 0.10 µm, respectively for a twenty and forty trilayer configuration. In a preferred embodiment Cyclotene™ 3022-35 solution is spin-coated onto the SAS 50 and thermally cured at 130° C. for 30 minutes to form a smooth polymeric glassy polymer layer 90 having ellipsometry-derived thickness of approximately 2.0 µm. (See, e.g., FIG. 5C) Similarly, Cytop™ solution is spin-coated onto the glassy polymer layer 90 and thermally cured at 130° C. for 30 minutes to form a smooth polymeric top cladding layer 70 having an ellipsometry-derived thickness of approximately 1.6 µm. (See, e.g., FIG. 5C) A channel-type ridged waveguide (having a width, $w_l$, of approximately 4.0 µm, a height $h_l$ of approximately 2.0 µm, and a length of approximately 4.0 mm) is then patterned in the top cladding layer 70 and glassy polymer layer 90 using generally known photolithographic and reactive ion etching (RIE) techniques (see, e.g., FIG. 5D). Since SAS structures are difficult to etch with $CF_4$, $O_2$, and Ar in RIE, the waveguide height $h_1$ is etched to the same thickness as the Cyclotene™ polymer layer 90, i.e., 2.0 µm. Subsequently, the Cytop™ top cladding layer 70 is spin-coated and thermally cured at 130° C. for approximately 30 minutes, resulting in smooth polymeric films with ellipsometry-derived thickness of 2.0 mm and 1.6 mm, for the polymer layer 90 and cladding layer 70, respectively, followed by vapor phase deposition of a gold top electrode 30 having a width, $w_2$, of approximately 20 µm. (See, e.g., FIG. 5E)

Figure 8:
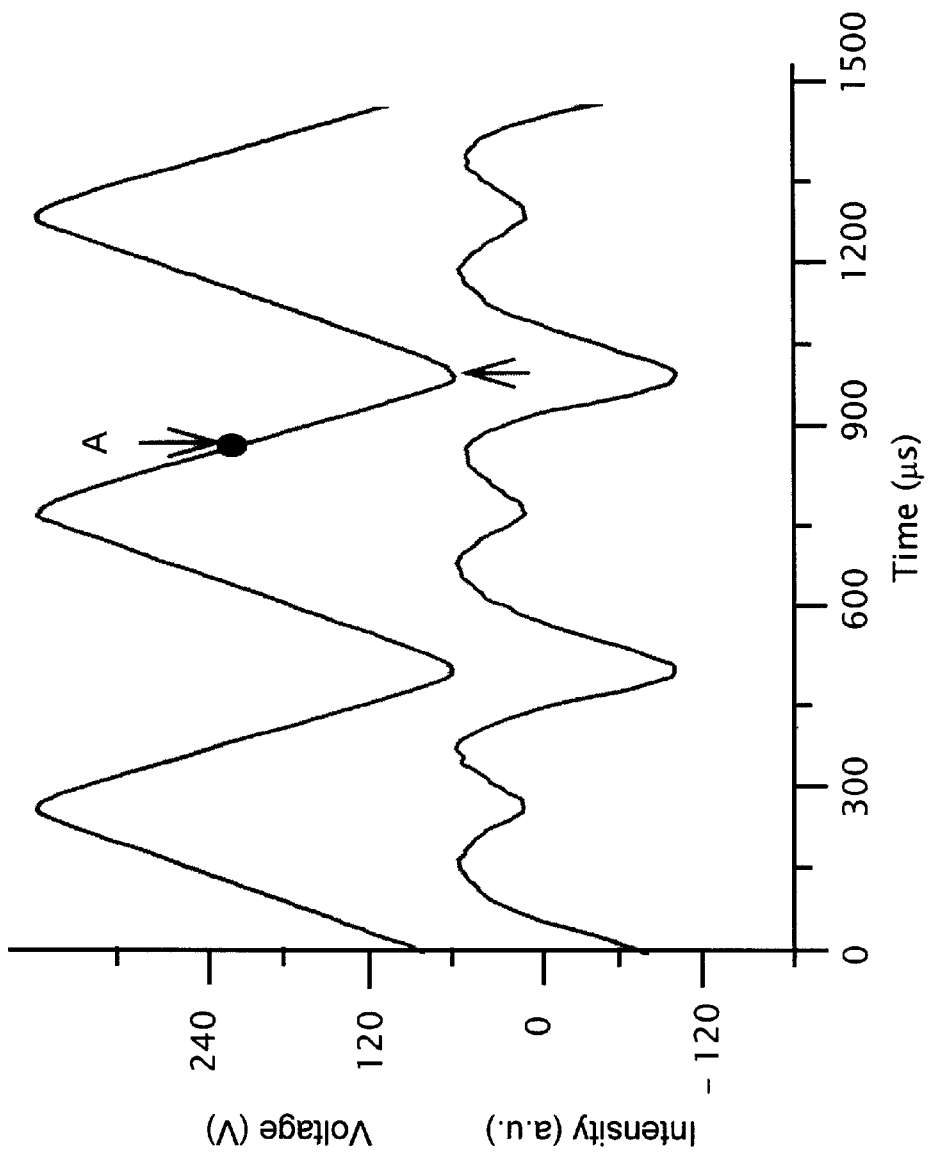
FIG. 8 is a graphical depiction of an experimentally derived $V_\pi$ of a 40-trilayer electro-optic modulator operating at 1060 nm.

To measure the performance of the inventive electro-optic modulator 100, a 40-trilayer SAS-based device was operated by applying a voltage to the electrodes 14, 30 and by simultaneously end-firing 1060 nm light from a diode-pumped Nd:YAG laser, which was coupled in and out of the 'hybrid' Cyclotene™/SAS waveguide 80 using a 40x microscope. The modulator 100 was operated by simultaneously launching both transverse electric (TE) and transverse magnetic (TM) modes into the waveguide 80, with light polarized at 45°. For recombining the input and output polarizations, the output light was passed through a polarizer oriented at 45° and normal to the direction of the polarizer at the input. The output light signal was coupled to a photodetector and measured using an oscilloscope. The electro-optic response of the modulator 100 is depicted in FIG. 8, where in can bee seen that the interference between the two orthogonally polarized modes produces a modulation signal having a half-wave voltage $V_\pi$ approximately equal to 160 V, as indicated by arrow A (see, e.g., FIG. 8). Negligible response decay over a two-week period in air was detected. For a 20-trilayer SAS-based device, modulation was observed at $V_\pi$ approximately equal to 300 V, suggesting that the drive voltage scales inversely with number of trilayers. Importantly, no response signal for modulating voltages up to 1000 V was observed in control devices fabricated without the SAS layer, unambiguously demonstrating that the observed π phase shift is generated within the SAS 50.

The difference in the refractive indices of Cyclotene™ and Cytop™ is preferably such that most of the light is confined within the Cyclotene™ layer 90 at desired telecommunications wavelength ranges (e.g., at 1550 nm). The characteristics of Cyclotene™ and Cytop™ with regard to their respective refractive indices and wavelength dependence is discussed in more detail in the article by Zhao et al. entitled "Polymer waveguides useful over a very wide wavelength range from the ultraviolet to infrared", Applied Physics Letters, Volume 77, Number 19, Nov. 6, 2000, which is hereby incorporated by reference in its entirety.

Figures 6A, 6B:
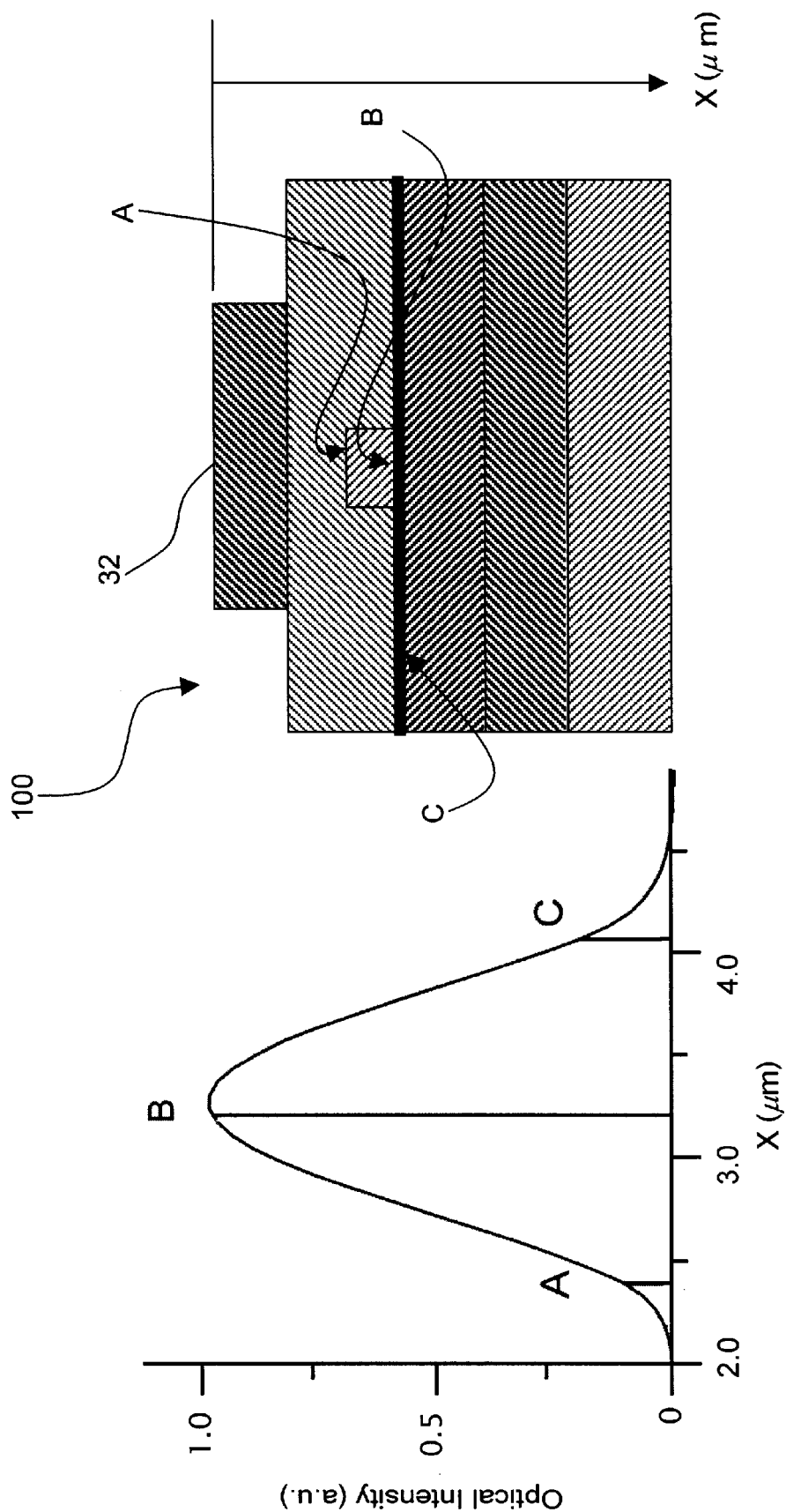
FIGS. 6A and 6B are, respectively, a graphical depiction of the optical intensity profile along the x-direction and perpendicular to the waveguiding Cyclotene™/SAS layer of an electro-optic phase modulator constructed in accordance with the present invention, and a cross-sectional view of an electro-optic phase modulator constructed in accordance with the present invention.

A theoretical optical intensity distribution of a 40-trilayer SAS modulator 100 is depicted by the graph of FIG. 6A, as taken along the direction perpendicular to the Cyclotene™/SAS waveguide 80, with the x-axis origin located at a top surface 32 of the top gold electrode 30, and as indicated in FIG. 6B. The optical intensities at points A and C occur at the Cytop™/Cyclotene™ and $SAS/SiO_2$ interfaces, respectively, and as indicated by the reference letters A and C. The optical intensity at point B occurs at the Cyclotene™/SAS interface, indicating that the light is indeed confined within the waveguide 80. Interestingly, the optical intensity maximum in the Cyclotene™/SAS waveguide 80 is positioned within the relatively thin SAS 50, which is due to the fact that the refractive index of the $SiO_2$ bottom cladding layer 16 (n is approximately equal 1.46) is greater than that of the Cytop™ top cladding layer 70 (n is approximately equal to 1.34). Thus, the maximum of the optical intensity in the waveguide 80 is located at a position near the bottom cladding layer 16, which means that the optical intensity in SAS 50 is larger than that in the interface between the Cytop™ top cladding layer 70 and Cyclotene™ polymer layer 90. The spatial overlap of the optical intensity profile depicted in FIG. 6A and the applied electric field, Γ, of approximately 0.02, can be derived from equation 1, where E(y,z) is the optical field distribution in the waveguide 80, A(y,z) is the applied electrical field distribution, and F(y,z) is a step function representing the F distribution in the waveguide 80.

$$\Gamma = \frac{E^2(y, z)A(y, z)F(y, z)dydz}{E^2(y, z)dydz} \quad (1)$$

The macroscopic effective electro-optic efficient ($r_{33}$) of the SAS-based EO phase modulator 100 is given by equation 2, where λ is the optical wavelength, $h_2$ is the distance between the top and bottom electrodes, 30, 14 (see, e.g., FIG. 6B) and preferably ranges from approximately 3.0 to 5.0 µm, n is the refractive index of the SAS 50, L is the modulator length (i.e., longitudinal length of the waveguide 80), and Γ is the overlap between optical intensity profile and optical field.

$$r_{33} = \frac{\lambda h_2}{n^3 V_\pi L \Gamma} \quad (2)$$

The calculated effective $r_{33}$ of approximately 115 pm/V for the electro-optic phase modulator 100 of the present invention is approximately triple that of $LiNbO_3$ modulators and rivals or exceeds that of the most efficient poled polymer modulators. For example, a $n^3 r_{33}/\epsilon$ is approximately equal to 73 pm/V for a modulator 100 constructed in accordance with the present invention, versus approximately 52 pm/V for the latest poled polymer devices.

Chemisorptive layer-by-layer self-assembly (SA) can yield organic superlattices on a large variety of substrates, however, integration of functional multilayers into the next generation of electronic and/or photonic devices has only begun. The present invention demonstrates a new entry to engineer organic modulators, and offers a general strategy for the incorporation of covalently interlinked SA materials into device structures. In contrast to typical polymer-based modulators, the present invention utilizes a siloxane SA methodology that enables the acentric alignment of constituent chromophores during film growth without the need for post-deposition electric-field poling. The use of $SiO_2$, Cytop™ and Cyclotene™ glassy polymers, results in a straightforward device formation process that is compatible with the thermally and photochemically robust SAS. Thus, nanoscale control of the film architecture results in greatly simplified macroscopic device fabrication. The present invention provides a SAS-based electro-optic modulator demonstrating excellent electro-optic response properties and a $\pi$ phase shift.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. An electro-optic phase modulator comprising:
    a substrate;
    a first electrode disposed on top of said substrate;
    a bottom cladding layer disposed on top of said first electrode having a first refractive index;
    a waveguide disposed on said bottom cladding layer and comprising:
        a self-assembled superlattice (SAS) chemically bonded to said bottom cladding layer and having a second refractive index; and
        a first glassy polymer having a third refractive index approximately equal to said second refractive index at a predetermined wavelength;
    a second glassy polymer top cladding layer disposed on top of said SAS film and having a fourth refractive index; and
    a second electrode disposed on top of said top cladding layer.

2. An electro-optic phase modulator as recited by claim 1, wherein said first glassy polymer is Cyclotene™ and wherein said second refractive index is approximately equal to 1.56.

3. An electro-optic phase modulator as recited by claim 2, wherein said predetermined wavelength is approximately equal to one of 1064 nm, 1300 nm, and 1550 nm.

4. An electro-optic phase modulator as recited by claim 2, wherein said second glassy polymer is Cytop™ and wherein said fourth refractive index is approximately equal to 1.34.

5. An electro-optic phase modulator as recited by claim 1, wherein said SAS comprises a plurality of molecular chromophore fragments each consisting of a plurality of electron donating and accepting groups interconnected by a conjugated $\pi$-electron system and exhibiting a large molecular hyperpolarizability, said donating and accepting groups of one molecular chromophore fragment being connected to said donating and accepting groups of another molecular chromophore fragment by silicon-oxygen linkages to form an acentric layered structure exhibiting a large electro-optic coefficient.

6. An electro-optic phase modulator as recited by claim 1, wherein said first cladding layer is $SiO_2$.

7. An electro-optic phase modulator as recited by claim 1, wherein said first and said second electrodes are gold.

8. A method of forming an electro-optic phase modulator on a substrate and having first and second electrodes, said method comprising the steps of:
    providing a first cladding layer having a first refractive index on the substrate;
    providing a self-assembled chromophore superlattice (SAS) having an intrinsic polar structure and a second refractive index on the first cladding layer;
    providing a first glassy polymer having a third refractive index on the SAS, the third refractive index being approximately equal to the second refractive index at a predetermined wavelength; and
    providing a second cladding layer having a fourth refractive index, the second cladding layer on the SAS and about the first glassy polymer.

9. A method as recited by claim 8, wherein the second and third refractive indices are greater than the first and fourth refractive indices.

10. A method as recited by claim 9, wherein the second and third refractive indices are approximately equal to 1.54.

11. A method as recited by claim 8, wherein the first glassy polymer is Cyclotene™ and wherein the third refractive index is approximately equal to 1.54.

12. A method as recited by claim 8, wherein the second glassy polymer is Cytop™ and wherein the fourth refractive index is approximately equal to 1.34.

* * * * *

UNITED STATES PATENT AND TRADEMARK OFFICE
CERTIFICATE OF CORRECTION

PATENT NO. : 6,549,685 B2
DATED : April 15, 2003
INVENTOR(S) : Tobin J. Marks et al.

It is certified that error appears in the above-identified patent and that said Letters Patent is hereby corrected as shown below:

<u>Column 2,</u>
Line 14, "≧" should be -- ≥ --

<u>Column 5,</u>
Line 32, "≧" should be -- ≥ --

<u>Column 6,</u>
Line 9, "SD" should be -- 5D --

<u>Column 8,</u>
Line 31, "F" should be -- Γ --

Signed and Sealed this

Twentieth Day of January, 2004

JON W. DUDAS
*Acting Director of the United States Patent and Trademark Office*